(12) United States Patent
Wood et al.

(10) Patent No.: US 8,183,845 B2
(45) Date of Patent: May 22, 2012

(54) LOW VOLTAGE POWER SUPPLY

(75) Inventors: Jonathan Wood, Sudbury, MA (US); Timothy Krahn Trudeau, Roanoke, VA (US)

(73) Assignee: Exelis, Inc., McLean, VA (US)

( * ) Notice: Subject to any disclaimer, the term of this patent is extended or adjusted under 35 U.S.C. 154(b) by 694 days.

(21) Appl. No.: 12/276,721

(22) Filed: Nov. 24, 2008

(65) Prior Publication Data
US 2010/0127675 A1    May 27, 2010

(51) Int. Cl.
*G05F 1/00* (2006.01)
(52) U.S. Cl. .......................................... 323/282
(58) Field of Classification Search .................... 323/282
See application file for complete search history.

(56) References Cited

U.S. PATENT DOCUMENTS

| | | | |
|---|---|---|---|
| 4,546,421 A | 10/1985 | Bello et al. | |
| 4,849,651 A | 7/1989 | Estes, Jr. | |
| 5,677,619 A * | 10/1997 | Doluca | 323/282 |
| 5,805,433 A | 9/1998 | Wood | |
| 6,127,814 A * | 10/2000 | Goder | 323/282 |
| 6,166,527 A | 12/2000 | Dwelley et al. | |
| 6,522,113 B1 * | 2/2003 | Betten | 323/282 |
| 7,254,000 B1 * | 8/2007 | Smith et al. | 323/224 |
| 2004/0036458 A1 | 2/2004 | Johnson et al. | |
| 2006/0164135 A1 | 7/2006 | Myono et al. | |
| 2008/0253152 A1 | 10/2008 | D'Angelo et al. | |

OTHER PUBLICATIONS

Huniak, Amandine, EPO Authorized Officer, "International Search Report and Written Opinion of the International Searching Authority", PCT/US2009/065453 l, May 7, 2010.

* cited by examiner

*Primary Examiner* — Jue Zhang
(74) *Attorney, Agent, or Firm* — RatnerPrestia

(57) ABSTRACT

A buck regulator for converting an input DC voltage, $V^+$, into an output DC voltage level includes a coupled inductor for outputting the DC voltage level, and an error amplifier for sensing an error in the outputted DC voltage level and a pulse width modulator (PWM) providing a pulse waveform having a duty cycle responsive to the error. Also, included are a $V^+$ voltage driver for outputting the $V^+$ voltage level responsive to the pulse waveform, and a super voltage driver for outputting a super voltage level, Vss, responsive to the pulsed waveform, wherein the super voltage level is higher than the $V^+$ voltage level. The outputted super voltage level is complementary to the outputted $V^+$ voltage level. Also included are dual MOSFETs, which have gates for, respectively, receiving the super voltage level and the $V^+$ voltage level. The dual MOSFETs drive the coupled inductor for outputting the DC voltage level. Furthermore, a pulse shaper is coupled between the PWM and the voltage drivers for forming a sharp pulse having a rise time that is faster than a rise time of the pulse waveform. The sharp pulse is provided as a control signal for activating the voltage drivers.

18 Claims, 8 Drawing Sheets

LOW VOLTAGE POWER SUPPLY

FIELD OF THE INVENTION

The present invention relates, generally, to low power DC-to-DC buck regulator supplies. More specifically, the present invention relates to a DC-to-DC buck regulator power supply with pulse width modulated (PWM) control.

BACKGROUND OF THE INVENTION

Pulse width modulation (PWM) is a known technique for DC voltage regulation, and is widely used in maintaining a constant output voltage despite wide variation in the input voltage and despite wide variations in load current. This technique is used to supply DC power to many different electronic systems.

In general, all pulse width modulators employ switching circuitry to generate pulses which are smoothed by an inductor-capacitor filter network to produce a substantially constant output of a DC voltage level. The magnitude of the DC output voltage is controlled by the duty cycle ratio of the switching circuitry.

To maintain a constant output voltage level, a feedback arrangement is conventionally employed. This calls for an output voltage to be compared with a stable voltage reference for developing an error signal by way of an error amplifier the output of which controls the duty cycle ratio of the switching circuitry by way of a comparator. When the output voltage drops too low, the error amplifier increases the switching duty cycle; when the output voltage rises too high, the switching duty cycle is reduced.

In addition, conventional buck regulated power supplies are inefficient due to losses in the switching circuitry and heat dissipation in the cores of the inductors. The heat dissipation is high due to the high operating frequency of the switching circuitry, which is typically greater than 250 KHz.

As will be explained, the present invention provides an efficient low power, buck regulator power supply that operates at a low switching frequency, minimizes gate drive power in the power converter, and maintains minimal dissipation in the control circuitry.

SUMMARY OF THE INVENTION

To meet this and other needs, and in view of its purposes, the present invention provides a buck regulator for converting an input DC voltage, $V^+$, into an output DC voltage level. The buck regulator includes an inductor for outputting the DC voltage level; an operational amplifier for sensing an error in the outputted DC voltage level, and a comparator acting as a pulse width modulator (PWM) for providing a pulsed waveform having a duty cycle responsive to the error. Also included are upper and lower high power drivers. The lower driver is powered from $V^+$ and switches between 0 volts and $V^+$ voltage level responsive to the PWM waveform. The upper driver is powered from a super voltage and thus switches between 0 volts and the super voltage level responsive to the PWM waveform. The super voltage is generated from $V^+$ using a voltage doubler circuit and is thus at a higher potential than the $V^+$ voltage level. The outputs from the two drivers are complementary. Also included are dual MOSFETs, placed in a totem pole arrangement and having gates respectively, receiving the outputs from power drivers. The upper MOSFET gate is driven by the output of the upper driver. The lower MOSFET gate is driven by the output of the lower driver. Together the dual MOSFETs drive the inductor for outputting the DC voltage level.

The buck regulator includes a pulse shaper coupled between the PWM and the upper and lower high power drivers for forming a sharp pulse having a rise time and a fall time that is faster than that of the PWM. The sharp pulse is provided as a input signal for activating the upper and lower high power drivers. The pulse shaper includes at least one inverter for shaping the sharp pulse. The pulse shaper is coupled between the PWM and the upper and lower high power drivers for forming the sharp pulse. The pulse shaper is disposed in a chip having multiple inverters, and is configured to include at least one of the multiple inverters based on polarity sense for activating the voltage drivers.

Another embodiment of the present invention is a low voltage regulated power supply. The low voltage power supply includes:

(a) a rail for providing an output DC voltage level, (b) a sense feedback signal for providing the output DC voltage level from the rail to an error detector, (c) the error detector is configured to provide a control signal in response to the sense feedback signal, for controlling upper and lower high speed, high power drivers, (d) the high speed, high power drivers are configured to drive a dual MOSFET configuration in response to the control signal, and (e) the high speed, high power drivers operate in a complementary manner to each other for effectively driving the dual MOSFET configuration to generate the output DC voltage level on the rail.

(f) the complementary outputs of the high speed, high power drivers are configured such that both MOSFETs can never be simultaneously turned on.

A pulse shaper is coupled between the error detector and the upper and lower high speed, high power drivers. The pulse shaper is configured to shape the control signal by producing fast switching times. The control signal feeds a pair of complementary high speed, high power drivers.

The dual MOSFET configuration includes upper and lower MOSFETs configured in a totem-pole arrangement, in which the gate of the first MOSFET is driven by one of the high speed, high power drivers and a gate of the second MOSFET is driven by the other high speed, high power driver. The first MOSFET is driven by one of the high speed, high power driver providing an input switch between 0V and $V^+$ to the gate of the lower MOSFET. The second MOSFET is driven by the other high speed, high power driver providing an input switch between 0V and a super voltage of Vss to the gate of the upper MOSFET. The Vss voltage level is approximately twice the $V^+$ voltage level.

Yet another embodiment of the present invention is a buck regulator for outputting a DC voltage level using an input input voltage level of $V^+$. The buck regulator includes:

(a) an error amplifier for sensing a voltage level error in the output DC voltage level, (b) a PWM having a duty cycle responsive to the sensed voltage level error, (c) a pulse shaper, coupled to the PWM, for providing a fast transitioning pulse waveform, (d) upper and lower power drivers receiving the fast transitioning pulse waveform and providing complementary upper and lower driving voltages, wherein the lower driving voltage is the $V^+$ voltage level and the upper driving voltage is a super voltage level, Vss, of approximately twice the $V^+$ voltage level, (e) upper and lower FETs connected in a totem-pole arrangement, wherein the lower FET has a gate for receiving the lower driving voltage and the upper FET has another gate for receiving the upper driving voltage, and (f) the two FETs are coupled to an inductor for outputting the DC voltage level. The first driving voltage of $V^+$ drives the first FET and the second driving voltage of Vss drives the second FET in a complementary manner to provide the DC voltage level. The super voltage level of Vss is generated by a charge pump circuit coupled to the $V^+$ input voltage level. The pulse shaper includes at least one inverter configured from a chip having a plurality of inverters. When the upper power driver is producing an inverted output with respect to the fast transitioning input waveform, the lower power driver is producing a non-inverted output. When the upper power driver is producing a non-inverted output with respect to the fast transitioning input waveform, the lower power driver is producing an inverted output.

The dual MOSFETs are configured in a totem-pole arrangement, and are coupled between the $V^+$ voltage level and a ground potential for driving the inductor. The voltage drivers are configured to provide the super voltage level, to the gate of upper MOSFET and thus turning it on when the $V^+$ voltage level is not provided to the gate of the lower MOSFET thus turning it off, and configured to provide the $V^+$ voltage level, to the gate of lower MOSFET and thus turning it on when the super voltage level is not provided to the gate of the upper MOSFET thus turning it off.

The inductor includes a primary coil and may also include a secondary coil, in which case it is commonly referred to as a "coupled inductor". The primary coil is coupled between the dual MOSFETs and a capacitor for providing the output DC voltage level. The optional secondary coil includes one end coupled to either the ground potential or to one end of the primary coil, and the other end of the secondary coil is coupled to a rectifier for providing second output DC voltage level.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

Figure 1:
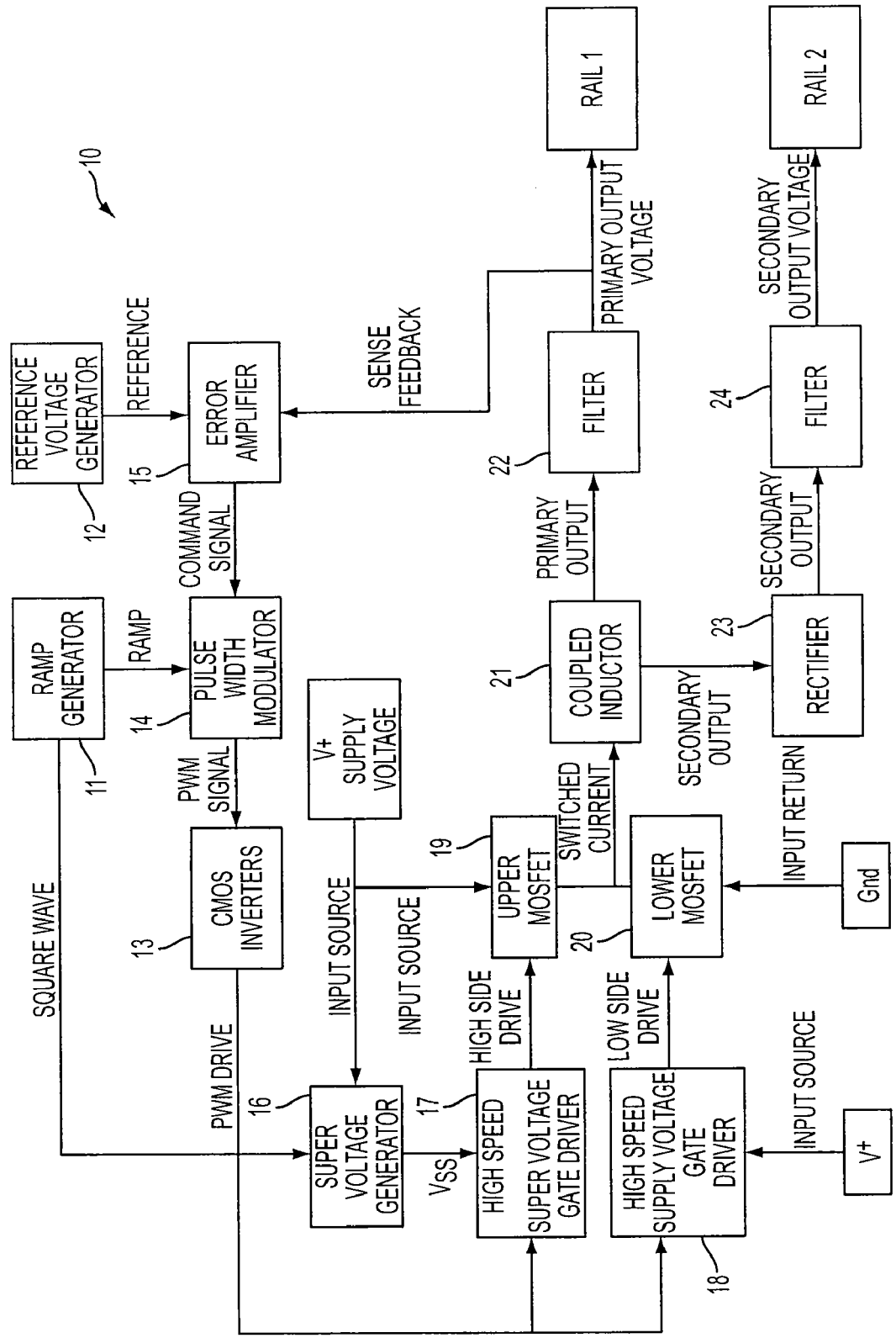
FIG. 1 is block diagram of a regulated low voltage power supply, in accordance with an embodiment of the present invention.

The present invention provides a low voltage, highly efficient buck regulator power supply. The present invention uses an input DC voltage which is higher than the output regulated DC voltage. The input DC voltage, for example, may be a DC voltage ranging from 5 VDC to 20 VDC; and the output regulated DC voltage may be a DC voltage ranging from 1 VDC to 10 VDC.

The present invention provides an efficient regulated power supply in the low power range of 0.2 watts to 2.0 watts, for example. Whereas conventional low power DC regulators are less than 80% efficient, the present invention provides an efficiency greater than 90%. This high efficiency is achieved by minimizing gate drive power, maintaining minimal duty cycle for certain components, and operating at a low switching frequency (for example, less than 50 KHz).

An embodiment according to the present invention is based upon an insight that synchronous rectification with two N-type MOSFETS, arranged as a totem-pole, allows for minimal conduction losses. N-type MOSFETS typically exhibit lower resistances in their ON state than P-type MOSFETS.

An embodiment according to the present invention is also based upon an insight that low switching frequencies (less than 100 kHz, for instance) allow for low switching losses in the MOSFETs and associated gate drivers.

An embodiment according to the present invention is further based upon the insight that while the gate driver for the upper N-type MOSFET requires a supply voltage level (a supervoltage, Vss) in excess of the supply voltage V+ for the totem pole pair, the gate driver for the lower N-type MOSFET requires a supply voltage level no greater than the supply voltage V+ for the totem pole pair; and that gate drive losses for each gate driver increase as the square of the magnitude of the voltage applied to the gate driver.

An embodiment according to the present invention is yet further based upon an insight that the use of a commonly available PWM comparator with open-collector output (such as the LM339, LM393, and related types) allows for operation of a buck regulator at low switching frequencies (less than 100 kHz, for instance).

An embodiment according to the present invention is still further based upon an insight that power dissipation in the pull-up resistor associated with an open-collector style of PWM comparator may be minimized by ensuring that the duty cycle of the output voltage waveform for the PWM comparator is maximized and does not fall below 50%.

An embodiment according to the present invention is even further based upon an insight that power dissipation in the pull-up resistor associated with an open-collector style of PWM comparator may be minimized by employing high values of pull-up resistance and by employing a CMOS inverter to provide pulse shaping to correct for pulse distortion resulting from the high pull-up resistance values.

An embodiment according to the present invention is still further based upon an insight that operation of a PWM comparator at a high duty cycle may be accomplished in a buck regulator either by employing an odd or even number of CMOS inverters for pulse-shaping, or by employing gate driver chips of appropriate polarity.

An embodiment according to the present invention is even yet still further based upon an insight that excessive variations in secondary-channel output voltage over temperature result from the thermal sensitivity of a schottky (or other type of) rectifying diode, and that this shortcoming may be overcome by an appropriate replacement of a diode by a MOSFET transistor.

As will be explained, the low voltage power supply of the present invention includes the following features:

(a) Synchronous rectification is used in a buck regulator topology with two N-type MOSFETS, arranged as a totem-pole.

(b) An open-collector style comparator is used, such as an LM339 or LM393, or equivalent.

(c) At least one CMOS inverter is used, such as a CD4069, or equivalent.

(d) A first high speed driver chip such as an IXDF502 is used to provide power from an input voltage (V+) to drive the gate of one MOSFET.

(e) A second high speed driver chip is used to provide power from a super voltage (Vss) to drive the gate of the other MOSFET. The super voltage (Vss) is approximately twice the input voltage (V+); in other words, Vss is approximately equal to 2V+.

(f) The relative phasing of the input terminals of the comparator, and the relative phasing of the first and second high speed driver chips together with the number of CMOS inverters employed, provide for a steady state duty cycle of the comparator output that is as high as possible, and in any case not less than 50%. This arrangement ensures minimal power dissipation in the pull-up resistor that accompanies the open-collector style comparator.

(g) A size efficiency is realized by the present invention, because the high speed driver chips are optionally provided as dual gate driver chips having both inverting and non-inverting outputs. The driver chips may be configured to minimize parts count, while retaining a comparator duty cycle greater than 50%, even when two rail output voltages are required. One of the rail output voltages may even be greater than 50% of the input voltage (V+).

(h) The power supply of the present invention may be used in any portable device having an output voltage requirement that is less than an input voltage ranging from 5 VDC to 20 VDC and a very high efficiency requirement in the low power range of less than 2 watts per rail.

Referring first to FIG. 1, there is shown a block diagram of an exemplary power supply, generally designated as 10, in accordance with an embodiment of the present invention. As shown, power supply 10 has a DC input of V+ and produces two regulated buck output voltages on Rail 1 and Rail 2. The Rail 1 voltage is referred to herein as the primary output voltage, whereas the Rail 2 voltage is referred to as the secondary output voltage.

The output from Rail 1 is used as a sense feedback into error amplifier 15, in which the latter compares the Rail 1 voltage against a reference voltage, Vref, produced by reference voltage generator 12. The resulting command signal from error amplifier 15 is provided to a pulse width modulator 14. The modulator compares a ramp (or a sawtooth) voltage generated by triangle wave generator 11 with the command signal generated by error amplifier 15 to form a pulse waveform output, referred to herein as a pulse width modulated (PWM) error signal.

Figure 2:
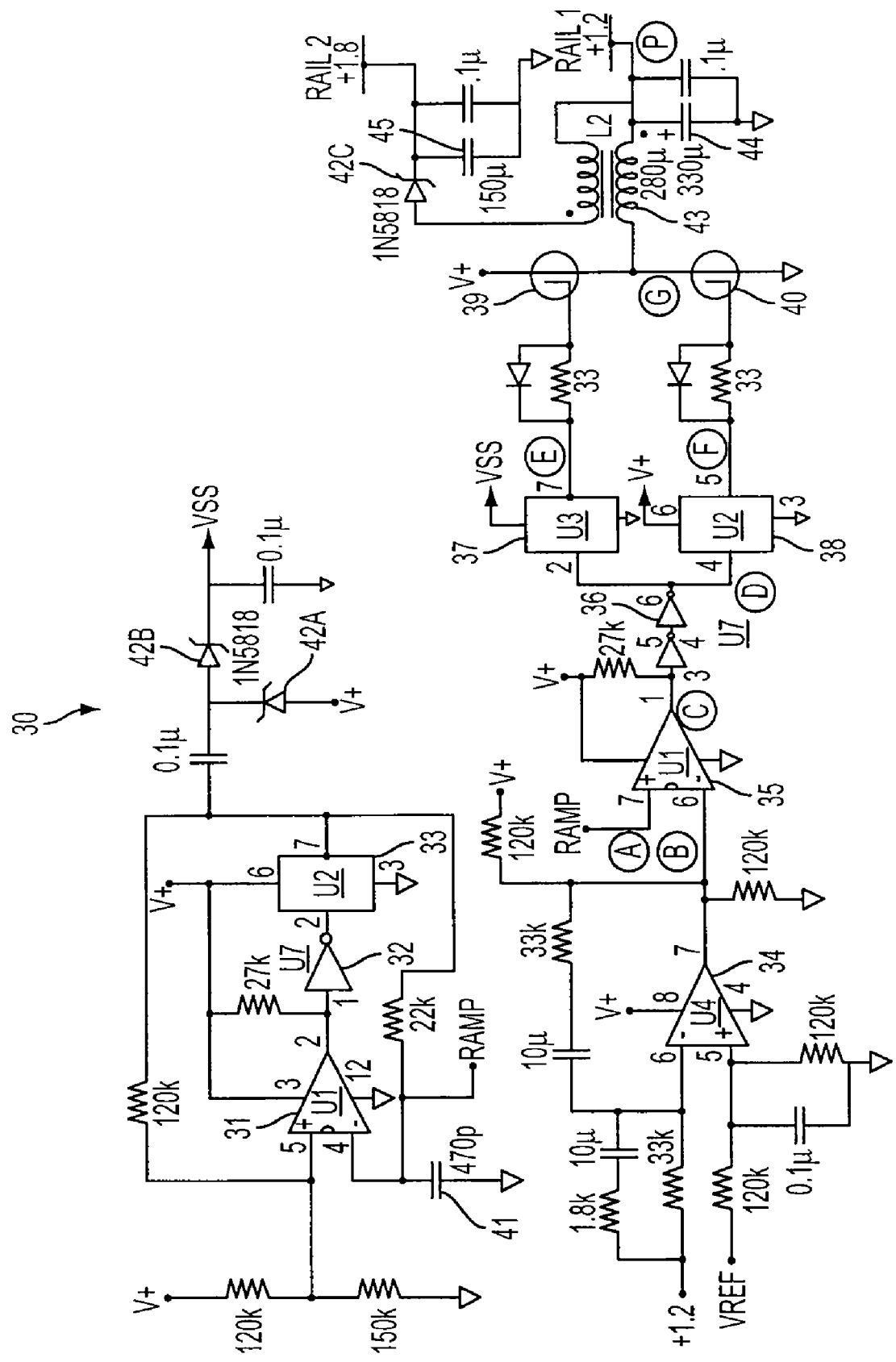
FIG. 2 is schematic diagram of an exemplary regulated low voltage power supply, which is similar to the block diagram of FIG. 1, in accordance with an embodiment of the present invention.
Figure 3:
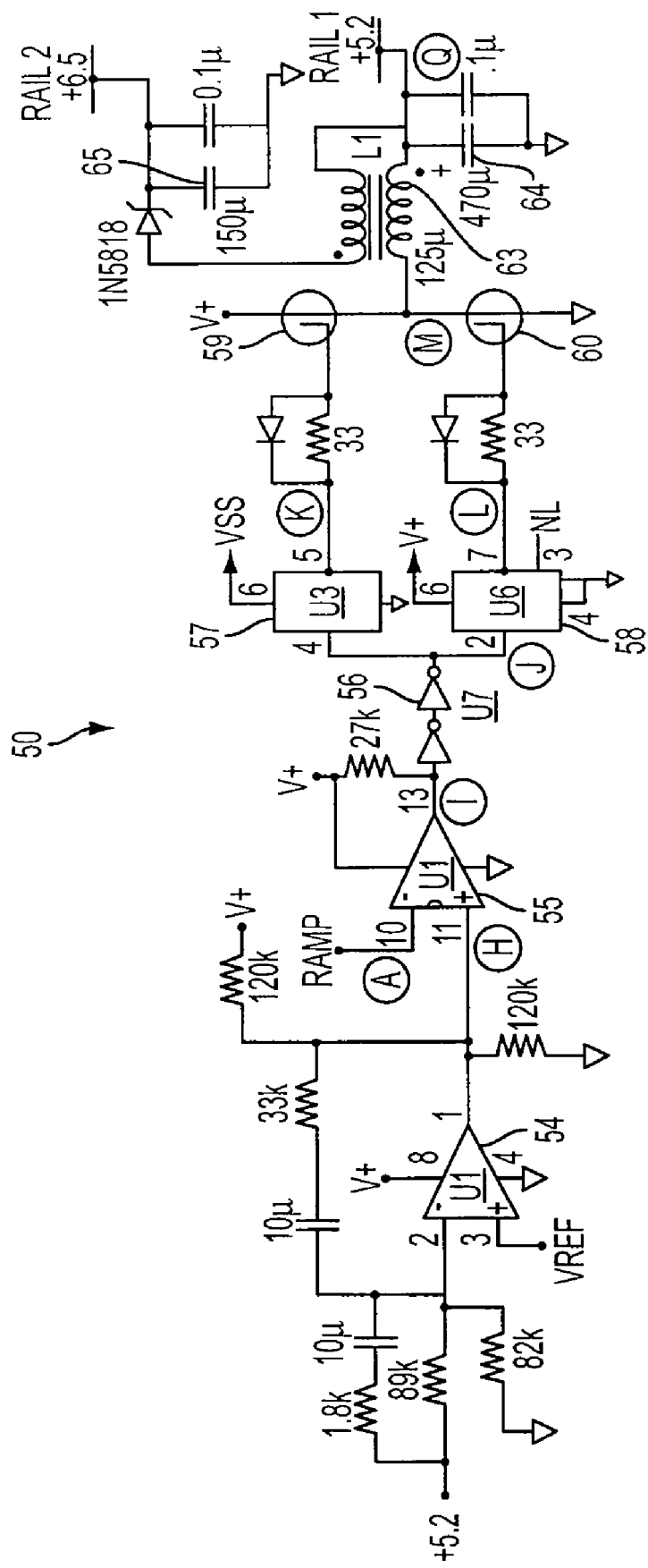
FIG. 3 is schematic diagram of another exemplary regulated low voltage power supply, which is similar to the block diagram of FIG. 1, in accordance with an embodiment of the present invention.

The CMOS inverters 13 receive the PWM signal to form the PWM drive signal. As will be explained, CMOS inverters 13 are part of a set of hex inverters and are used to re-shape the pulse formed by modulator 14. The CMOS inverters change a slow off/on transition time of the PWM signal and form a rapid off/on transition time to an output signal referred to as the PWM drive signal. Since the CMOS inverter integrated circuit package typically includes six inverters, the present invention provides sufficient flexibility to form a very fast off/on transition time, which may be an inverted or a non-inverted form of the PWM signal outputted by modulator 14. For example, as shown in FIGS. 2 and 3, the CMOS inverter integrated circuit package U7 includes two inverters, designated as 36 in FIG. 2 and as 56 in FIG. 3. The remaining inverters in U7 are not used in these examples. Although two inverters are used here in each of 36 and 56, an alternative embodiment may employ just one inverter in each of 36 and 56, while exchanging the polarities of gate drivers 37 and 38, and similarly exchanging the polarities of gate drivers 57 and 58.

Continuing the description of FIG. 1, the PWM drive signal, after having been "cleaned-up" by the CMOS inverters 13, is provided as an input pulse into high speed super voltage gate driver 17 and high speed supply voltage gate driver 18. It will be appreciated that super voltage gate driver 17 may be an inverting driver, as shown in FIG. 2 by driver 37, or may be a non-inverting driver as shown in FIG. 3 by driver 57. Similarly, driver 18 may be a non-inverting driver, as shown in FIG. 2 by driver 38, and may be an inverting driver, as shown in FIG. 3 by driver 58.

Super voltage driver 17 receives the super voltage Vss from super voltage generator 16 and, when turned on, provides a Vss voltage output (high side drive) to the gate of upper MOSFET 19. Similarly, voltage driver 18 receives the supply voltage V+ from the input power source (V+) and, when turned on, provides a V+ voltage output (low side drive) to lower MOSFET 20.

Upper MOSFET 19 and lower MOSFET 20, in a complementary manner, provide a switched output to the primary coil of coupled inductor 21 as shown in FIGS. 2 and 3. The MOSFETs 19 and 20 are arranged in a totem-pole configuration (as shown in FIG. 2 by MOSFETs 39 and 40; and in FIG. 3 by MOSFETs 59 and 60).

Filter 22 consists of a coupled inductor (43 in FIG. 2, and 63 in FIG. 3) together with an output capacitor (44 in FIG. 2, and 64 in FIG. 3), and delivers the primary output voltage on Rail 1. This primary output voltage is also fed back to error amplifier 15, as described before. The coupled inductor 21 also provides a secondary output to rectifier 23, which is then filtered by filter 24 to provide a secondary output voltage on Rail 2. It will be appreciated, however, that the secondary output to rectifier 23 and filter 24 may be omitted, when a second rail output is not required. It should also be noted that a third or even a fourth output rail could be constructed simply by adding additional windings to the coupled inductor and providing additional output filters.

Completing the description of FIG. 1, power supply 10 includes reference voltage generator 12, which is used as a reference DC voltage by error amplifier 15 to generate an error signal to modulator 14. Also included is super voltage generator 16, which receives the V+ input voltage and a square wave from the ramp generator, and provides the Vss voltage (2V+) to super voltage driver 17.

Having described DC power supply 10 of the present invention by reference to FIG. 1, more specific description will now be provided by reference to FIGS. 2 and 3, respectively, showing DC power supply 30 and DC power supply 50. The power supplies 30 and 50 are different embodiments of the present invention.

Referring first to FIG. 2, power supply 30 includes comparator 31, inverter 32 and inverting driver 33, which together with the multiple resistors and capacitor 41 form a ramp generator (designated as 11 in FIG. 1). The ramp wave generator produces a shark-fin ramp waveform, shown as A in FIG. 4. The duration of the rising and falling portions of the ramp waveform are not necessarily equal. The ramp waveform may have, for example, a frequency of less than 100 kHz. The ramp is provided as an input signal to comparator 35 (shown as modulator 14 in FIG. 1).

The super voltage generator (designated as 16 in FIG. 1) includes two rectifiers 42a and 42b, which are connected to V+ and to the output of driver 33 by way of a capacitor. The output of the super voltage generator Vss is approximately twice the input voltage V+. The rectifiers are typically silicon schottky diodes, and may be, for example, two 1N5818 diodes. As shown, the Vss voltage is provided to super voltage gate driver 37.

Still referring to FIG. 2, the error amplifier (designated as 15 in FIG. 1) includes operational amplifier 34 together with multiple resistors and capacitors disposed about operational amplifier 34. The operational amplifier 34 receives the primary output voltage (1.2 V at the primary output of coupled inductor 43 at Rail 1, for example) as a sensed feedback signal and compares the sensed feedback signal to a scaled replica of the voltage reference signal ($V_{REF}$). Operational amplifier 34 provides a steady output signal (shown as waveform B in FIG. 4) which moves up or down until no difference exists between the feedback signal and the scaled replica of the voltage reference.

The pulse-width-modulation (PWM) function is provided by comparator 35. As shown in FIG. 2, the output of comparator 35 is connected to a 27 k pull-up resistor, which is required because comparator 35 includes an open collector output. The input signals into comparator 35 are the ramp signal (the A waveform in FIG. 4) and the error signal (the B waveform in FIG. 4). The output signal provided by comparator 35 is the PWM signal, shown as the C waveform in FIG. 4. It will be appreciated that while the duty cycle of the voltage waveform C is greater than 50%, the corresponding voltage waveform developed across the 27 k resistor has a duty cycle less than 50%, thereby minimizing power dissipation in the 27 k resistor.

Figure 4:
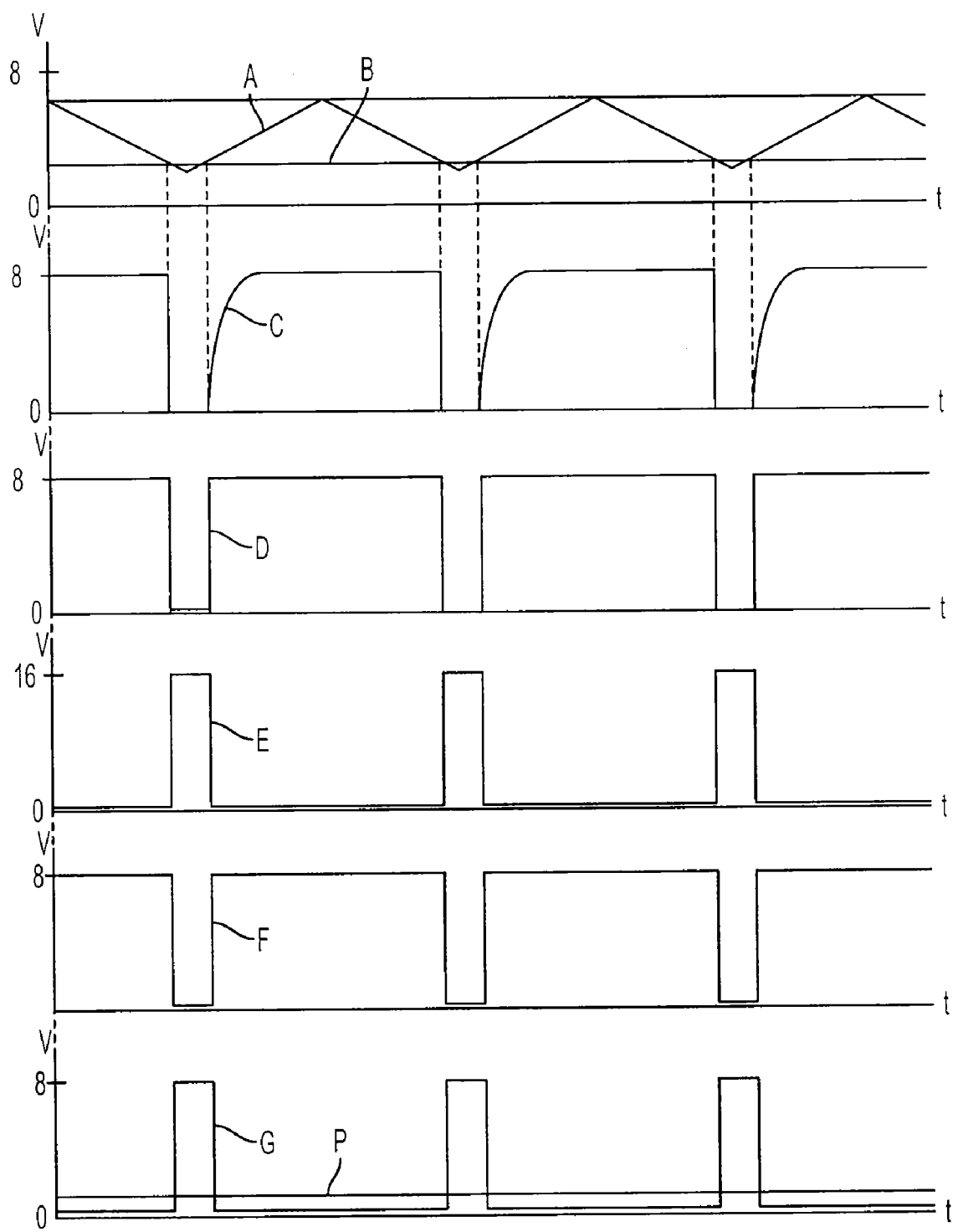
FIG. 4 is a timing diagram showing the signal relationships at various points in the regulated low voltage power supply shown in FIG. 2, in accordance with an embodiment of the present invention.

As shown by the C waveform in FIG. 4, the output rise time of comparator 35 is relatively slow, owing to the relatively high value of the 27 k resistor, intentionally chosen high to minimize power dissipation. The present invention, however, compensates for the relatively slow rise time by providing dual inverters, designated as 36 in FIG. 2 (and designated as CMOS Inverters 13 in FIG. 1). The output signal from dual inverters 36 has the same sense as the C waveform, except that the slow rise has been eliminated. The output signal of the CMOS Inverters is shown in FIG. 4 as waveform D.

The PWM drive (waveform D) is inputted to (a) super voltage gate driver 37 which has an inverting output, and (b) supply voltage driver 38 which has a non-inverting output. The output signals from super voltage driver 37 and supply voltage driver 38 are complementary to each other; namely, when one driver is on, the other driver is off. This is shown in FIG. 4 by waveforms E and F. It will be appreciated that the super voltage driver has an output that swings between Vss and zero, whereas the supply voltage driver has an output that swings between V+ and zero.

The complementary output signals from super voltage gate driver 37 and supply voltage gate driver 38 are used to drive the gates of MOSFET 39 and MOSFET 40. The MOSFETs 39 and 40 are connected in a totem-pole arrangement between V+ and ground potential, as shown in FIG. 2.

When waveform E is at Vss potential, upper MOSFET 39 is conducting current into the primary of coupled inductor 43. Vice versa, when waveform F is at V+ potential, lower MOSFET 40 is conducting current into the primary of coupled inductor 43. It will be appreciated that there is no moment of time in which both MOSFET 39 and MOSFET 40 are turned on simultaneously.

The combination of the primary coil of coupled inductor 43 with the 330 microfarad capacitor 44 provides a steady state voltage output at Rail 1. The steady state voltage output is driven to +1.2 VDC (as an example) by the feedback loop described above. High frequency components of the DC output are filtered by the 0.1 microfarad capacitor connected in parallel with capacitor 44. The output signal is shown as waveform P in FIG. 4.

As shown in FIG. 2, a +1.8 VDC (for example) regulated voltage is provided by the secondary coil of coupled inductor 43 together with rectifier 42c and the 150 microfarad capacitor 45. It will be appreciated that improved cross-regulation is achieved by the present invention on Rail 2 by connecting one end of the secondary coil of coupled inductor 43 to Rail 1 (the +1.2 VDC output). The high frequency components of the +1.8 VDC are filtered by the 0.1 microfarad capacitor connected in parallel with capacitor 45.

Figure 7:
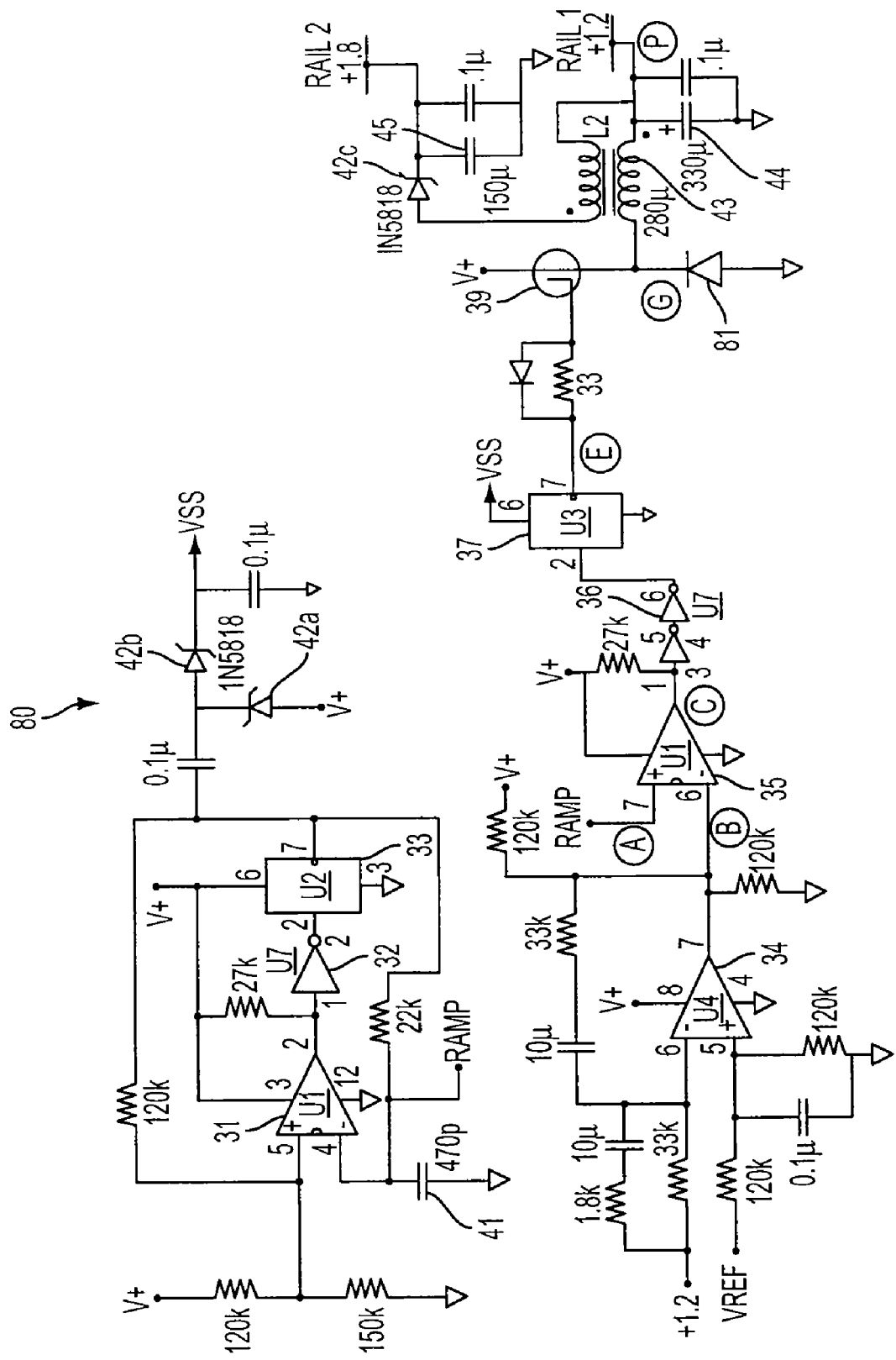
FIG. 7 is schematic diagram of yet another exemplary regulated low voltage power supply, which is similar to the block diagram of FIG. 1, in accordance with an embodiment of the present invention.

In another embodiment of the present invention, the lower MOSFET 40, shown in FIG. 2, may be replaced with a diode, in which its anode is connected to ground and its cathode is connected to the upper MOSFET 39. In this configuration, supply voltage driver 38 and the entire path required as an input to the gate of lower MOSFET 40 may be omitted. This alternative embodiment is illustrated in FIG. 7, where diode 81 replaces MOSFET 40 of FIG. 2.

Yet another embodiment of the present invention is shown in FIG. 3. The power supply 50 of FIG. 3 is similar to power supply 30, with a few exceptions. Whereas power supply 30 produces relatively low buck voltages of +1.2 VDC and +1.8 VDC (for example), power supply 50 produces relatively high buck voltages of +5.2 VDC and +6.5 VDC (for example).

Figure 5:
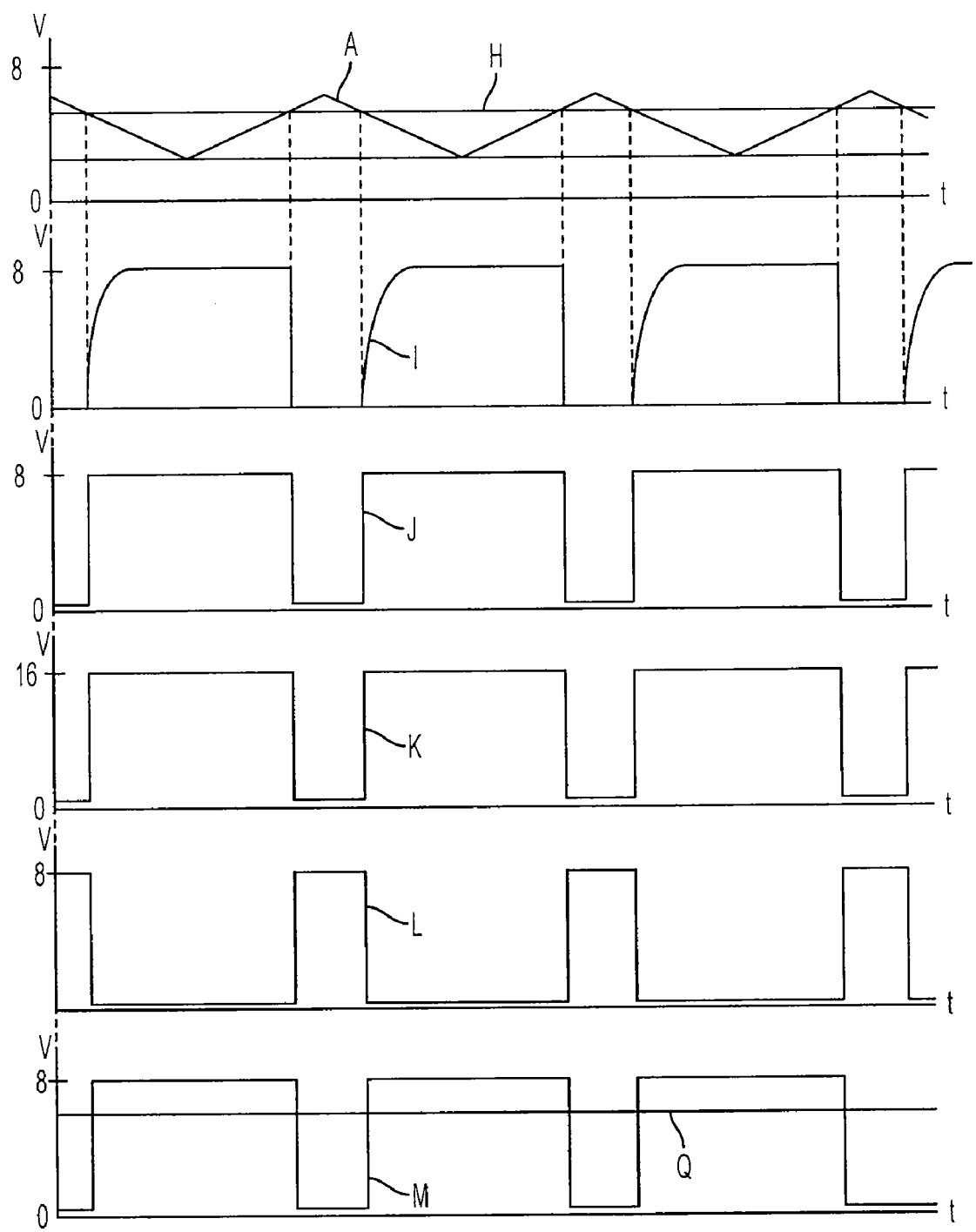
FIG. 5 is a timing diagram showing the signal relationships at various points in the regulated low voltage power supply shown in FIG. 3, in accordance with an embodiment of the present invention.

Operational amplifier 54 is surrounded by components somewhat different from the components surrounding comparator 34. In power supply 50, a scaled replica of the sensed feedback signal is compared to the voltage reference signal ($V_{REF}$). Operational amplifier 54 provides a steady output signal (shown as waveform H in FIG. 5) which moves up or down until no difference exists between the scaled replica of the feedback signal and the voltage reference.

The ramp waveform (A) inputted into comparator 55 is similar to the ramp waveform (A) inputted into comparator 35. It will be appreciated that whereas in FIG. 2 the ramp waveform feeds the non-inverting input terminal of comparator 35, in FIG. 3 the ramp waveform feeds the inverting input terminal of comparator 55, so as to ensure that the duty cycle of the voltage waveform I is greater than 50%, and therefore, that the corresponding voltage waveform developed across the 27 k resistor in FIG. 3 has a duty cycle less than 50%, thereby once again minimizing power dissipation in the 27 k resistor. This comparison between power supplies 30 and 50 illustrates the insight of the present invention that power dissipation in the pull-up resistor associated with an open-collector style of PWM comparator may always be minimized by ensuring that the duty cycle of the output voltage waveform for the comparator is maximized and does not fall below 50%, no matter whether the desired output voltage for the power supply is greater than or less than 50% of the supply voltage.

The super voltage gate driver 57 and supply voltage gate driver 58, respectively, are non-inverting and inverting drivers; whereas super voltage driver 37 and supply voltage gate driver 38, respectively, are inverting and non-inverting drivers. The waveforms provided by super voltage gate driver 57 and supply voltage gate driver 58 are shown, respectively, as waveforms K and L in FIG. 5. This difference in the polarities of the gate drivers between the arrangements of power supply 30 and power supply 50 is made to accommodate the different connection of the input terminals of comparators 35 and 55. It will be appreciated that an alternative method for obtaining the correct gate drive signals in power supply 50 is to use gate drivers with the same polarities as drivers 37 and 38 while at the same time using but a single inverter in place of the dual inverters 36 and 56.

Figure 6:
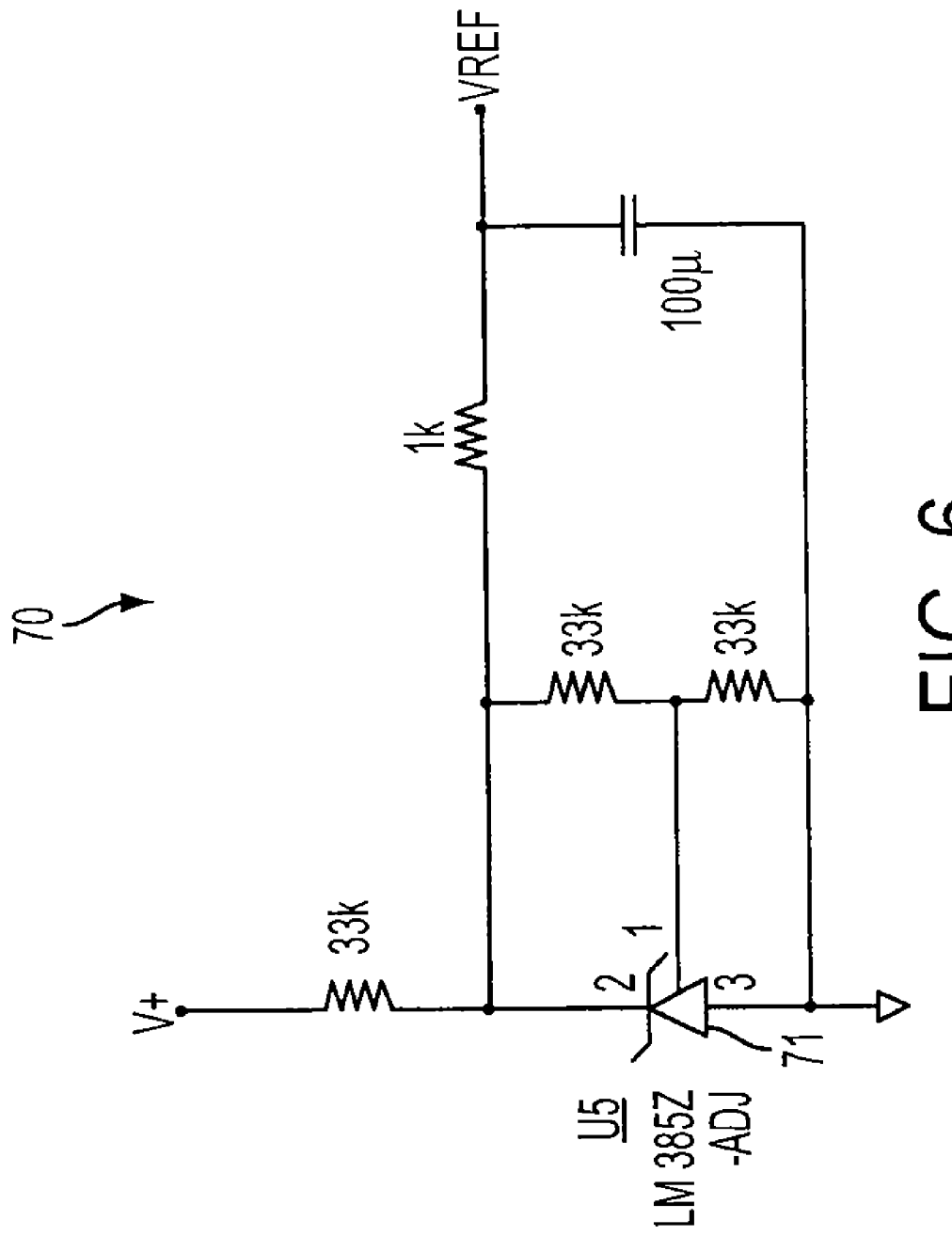
FIG. 6 is an exemplary voltage reference generator for generating the Vref voltage level used in the power supply shown in FIGS. 2 and 3.

Referring next to FIG. 6, there is shown an exemplary voltage reference generator, designated as 70, for producing Vref. The voltage reference may be produced using the input voltage of $V^+$ and may be adjusted using the resistors connected to pin 1 of the reference device 71, as shown.

Figure 8:
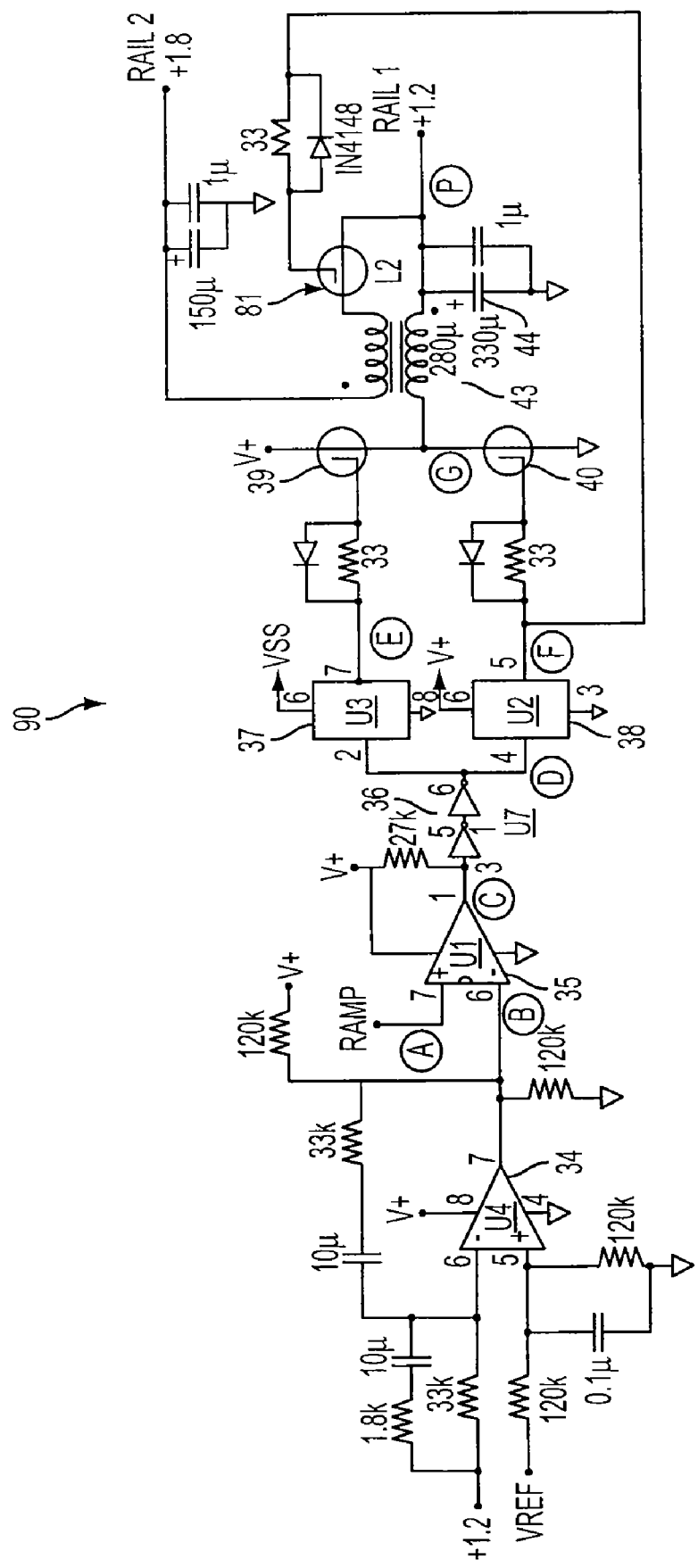
FIG. 8 is schematic diagram of still another exemplary regulated low voltage power supply, which is similar to the block diagram of FIG. 1, in accordance with an embodiment of the present invention.

In another embodiment of the present invention, diode 42c, which is shown in FIG. 2, may be replaced with a MOSFET 81, connected as shown in FIG. 8. This arrangement reduces thermal dependence of the Rail 2 voltage. As shown, the source lead of MOSFET 81 is connected to Rail 1, and the drain lead of MOSFET 81 is connected to one end of the secondary coil of coupled inductor 43. Diode 42c may then be replaced by a direct ohmic connection, so that the other end of the secondary coil of coupled inductor 43 connects directly to Rail 2. The output signal from supply voltage gate driver 38 is used to drive the gate of MOSFET 81.

Exemplary part numbers that may be used for the chips and coils shown in FIGS. 2 and 3 are listed below:

| Component Number | Part Number |
| --- | --- |
| U7 | CD4069 |
| L1 | 61-313-01 |
| L2 | 61-314-02 |
| U1 | LM339 |
| U2, U3, U6 | IXDF502 |
| U4 | LMC6462 |
| U5 | LM385Z |

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A buck regulator for converting an input DC voltage, $V^+$, into an output DC voltage level comprising:
    a coupled inductor for outputting the DC voltage level,
    a pulse width modulator (PWM) with an error amplifier for sensing an error in the outputted DC voltage level and providing a pulsed waveform having a duty cycle responsive to the error,
    a $V^+$ supply voltage driver for outputting the $V^+$ voltage level responsive to the pulsed waveform, the $V^+$ supply voltage being the input DC voltage,
    a super voltage driver for outputting a super voltage level responsive to the pulsed waveform, wherein the super voltage level is approximately twice the $V^+$ voltage level,
    the outputted super voltage level being complementary to the outputted $V^+$ voltage level,
    dual MOSFETs having gates for, respectively, receiving the super voltage level and the $V^+$ voltage level, and
    the dual MOSFETs driving the coupled inductor for outputting the DC voltage level,
    wherein the dual MOSFETs include upper and lower MOSFETs,
    a gate of the upper MOSFET receives the super voltage level, and
    a gate of the lower MOSFET receives the $V^+$ voltage level.

2. The buck regulator of claim 1 including
    a super voltage generator for forming the super voltage level and
    providing the super voltage level to the super voltage driver.

3. The buck regulator of claim 1 including
    a pulse shaper coupled between the PWM and the voltage drivers for forming a sharp pulse having a rise time that is faster than a rise time of the pulsed waveform, and
    providing the sharp pulse as a control signal for activating the voltage drivers.

4. The buck regulator of claim 3 wherein
    the pulse shaper includes at least one inverter for shaping the sharp pulse.

5. The buck regulator of claim 4 wherein
    the pulse shaper includes two inverters connected in series for shaping the sharp pulse.

6. The buck regulator of claim 3 wherein
    the PWM includes an open collector comparator and a resistive load for providing the pulsed waveform in response to the error.

7. The buck regulator of claim 1 wherein
    the dual MOSFETs are configured in a totem-pole arrangement, and
    coupled between the $V^+$ supply voltage level and a ground potential for driving the coupled inductor.

8. The buck regulator of claim 1 wherein
    the voltage drivers are configured to provide the super voltage level, when the $V^+$ voltage level is not provided, and
    provide the $V^+$ voltage level, when the super voltage level is not provided.

9. The buck regulator of claim 1 including
    an error amplifier for generating a command signal by comparing the output DC voltage level against a voltage reference,
    wherein the PWM compares a ramp waveform with the command signal generated by the error amplifier to provide the pulsed waveform having a duty cycle responsive to the error.

10. The buck regulator of claim 1 wherein
    the coupled inductor includes a primary coil and a secondary coil, and
    the primary coil is coupled between the dual MOSFETs and a capacitor for providing the output DC voltage level.

11. The buck regulator of claim 10 wherein
    the secondary coil includes one end coupled to an end of the primary coil, and another end of the secondary coil coupled to a rectifier for providing another output DC voltage level.

12. The buck regulator of claim 1 including
    a pulse shaper coupled between the PWM and the voltage drivers for forming a sharp pulse having a rise time that is faster than a rise time of the pulsed waveform, and providing the sharp pulse as a control signal for activating the voltage drivers, wherein the pulse shaper is disposed in a chip having multiple inverters, and the pulse shaper is configured to include at least one of the multiple inverters based on polarity sense for activating the voltage drivers.

13. A buck regulator for outputting a DC voltage level using an input input voltage level of $V^+$ comprising:

a PWM for sensing a voltage level error in the output DC voltage level, a pulse shaper, coupled to the PWM, for providing a fast transitioning pulse waveform having a duty cycle responsive to the sensed voltage level error, upper and lower power drivers receiving the fast transitioning pulse waveform and providing complementary upper and lower driving voltages, wherein the first driving voltage is the $V^+$ voltage level and the second driving voltage is a super voltage level, VSS, of approximately twice the $V^+$ voltage level, upper and lower FETs connected in a totem-pole arrangement, wherein the first FET has a gate for receiving the first driving voltage and the second FET has another gate for receiving the second driving voltage, and the two FETs are coupled to a coupled inductor for outputting the DC voltage level, wherein the first driving voltage of $V^+$ drives the first FET and the second driving voltage of VSS drives the second FET in a complementary manner to provide the DC voltage level, the pulse shaper includes at least one inverter configured from a chip having a plurality of inverters, the pulse shaper is coupled between the PWM and the upper and lower power drivers, for providing the fast transitioning pulse waveform, the PWM includes an open collector comparator and a resistive load, the PWM provides the fast transitioning pulse waveform to the upper and lower power drivers, and the fast transitioning pulse waveform has a duty cycle greater than 50%, and a corresponding voltage waveform is developed across the resistive load of less that 50% for reducing power dissipation.

14. The buck regulator of claim 13 wherein the super voltage level of VSS is generated by rectifiers coupled to the $V^+$ input voltage level.

15. The buck regulator of claim 13 wherein when the first power driver includes an inverting output with respect to the fast transitioning pulse waveform, the second power driver includes a non-inverting output, and when the first power driver includes a non-inverting output with respect to the fast transitioning pulse waveform, the second power driver includes an inverting output.

16. The buck regulator of claim 13 wherein in the totem-pole arrangement, the lower FET is replaced with a diode.

17. The buck regulator of claim 13 further comprising a primary coil connected between the upper and lower FETs for providing a first DC output voltage level, a secondary coil, phased to the primary coil, for providing a second DC output voltage level, wherein one end of the secondary coil is configured to provide the second DC output voltage level and another end of the secondary coil is coupled to the first DC output voltage level by way of a MOSFET device.

18. The buck regulator of claim 17 wherein a gate of the MOSFET device is driven by the lower driving voltage.

\* \* \* \* \*